US011022685B2

(12) United States Patent
Novoselsky et al.

(10) Patent No.: US 11,022,685 B2
(45) Date of Patent: Jun. 1, 2021

(54) SYSTEM AND METHOD FOR CONSTRUCTING PICTURES OF TRACKS OF MOVING TARGETS FROM ELECTRO-OPTICAL DETECTIONS

(71) Applicant: Elta Systems Ltd., Ashdod (IL)

(72) Inventors: Akiva Novoselsky, Modi'in (IL); Benjamin Kupfer, Ramat Gan (IL); Merav Shomrony-Danieli, Herzliya (IL)

(73) Assignee: ELTA SYSTEMS LTD., Ashdod (IL)

( * ) Notice: Subject to any disclaimer, the term of this patent is extended or adjusted under 35 U.S.C. 154(b) by 15 days.

(21) Appl. No.: 16/688,519

(22) Filed: Nov. 19, 2019

(65) Prior Publication Data
US 2020/0166621 A1    May 28, 2020

(30) Foreign Application Priority Data

Nov. 26, 2018 (IL) .......................... 263303

(51) Int. Cl.
*G06K 9/00* (2006.01)
*G01S 11/12* (2006.01)
(Continued)

(52) U.S. Cl.
CPC .............. *G01S 11/12* (2013.01); *G06T 7/246* (2017.01); *G06T 7/73* (2017.01); *H04N 5/23229* (2013.01); *G06T 2207/30241* (2013.01)

(58) Field of Classification Search
CPC .......... G01S 11/12; G01S 3/786; G06T 7/246; G06T 7/73; G06T 2207/30241; G06T 7/20; H04N 5/23229
See application file for complete search history.

(56) References Cited

U.S. PATENT DOCUMENTS

| 5,842,156 A | 11/1998 | Hong et al. |
| 2010/0157056 A1 | 6/2010 | Zohar et al. |

(Continued)

OTHER PUBLICATIONS

Bar-Shalom, Yaakov et al., "Estimation with Application to Tracking and Navigation", Extensions of Discrete Time Linear Estimation, 2001, pp. 320-339.

(Continued)

*Primary Examiner* — Tom Y Lu
(74) *Attorney, Agent, or Firm* — Dorsey & Whitney LLP

(57) ABSTRACT

A tracking system and method for constructing pictures of tracks of moving targets on a scene from electro-optical (EO) detections are described. The system includes EO sensors, and an EO tracker constructing pictures of the tracks of the targets. The EO tracker includes a pre-processing system for receiving EO detections of the targets and locating the targets on a world map, a candidate track selection system for finding candidate tracks, a track initializing module for receiving the EO detections and initializing a new track, an assigning system for assigning the EO detections to the candidate tracks, a data updating system for updating the candidate tracks after the assigning, and for generating an ambiguity set of tracks and an exclusion set of tracks, a picture providing system for receiving the ambiguity set and the exclusion set to generate a picture, and a tracker database for storing the updated tracks.

20 Claims, 6 Drawing Sheets

(51) Int. Cl.
    *G06T 7/246*     (2017.01)
    *G06T 7/73*     (2017.01)
    *H04N 5/232*     (2006.01)

(56) References Cited

U.S. PATENT DOCUMENTS

| | | | |
|---|---|---|---|
| 2011/0267221 A1* | 11/2011 | Brundick | G01S 13/02 |
| | | | 342/180 |
| 2011/0298654 A1* | 12/2011 | Hellsten | G01S 13/9029 |
| | | | 342/25 A |
| 2012/0070034 A1 | 3/2012 | Xiao et al. | |
| 2014/0191900 A1* | 7/2014 | Uysal | G01S 13/9029 |
| | | | 342/25 B |
| 2016/0148390 A1 | 5/2016 | Arambel et al. | |
| 2018/0106898 A1* | 4/2018 | Baskaran | G01S 7/411 |

OTHER PUBLICATIONS

Blackman, Samuel et al., "Design and Analysis of Moder Tracking Systems", Multiple Sensor Tracking: System Implementation and Applications, Artech House, 1999, pp. 678-699.

Maggio, Emilio et al., "Video Tracking Theory and Practice", Video Tracking: Theory and Practice, 2011, pp. 131-159.

Mallick, Mahendra et al., "Integrated Tracking, Classification and Sensor Management Theory and Application", GMTI Sensor Model, 2012, pp. 204-217 & 365-372.

\* cited by examiner $t1 < t2 < t3$ $t1 < t2 < t3$ t1< t2< t3< t4 t1< t2< t3< t4

SYSTEM AND METHOD FOR CONSTRUCTING PICTURES OF TRACKS OF MOVING TARGETS FROM ELECTRO-OPTICAL DETECTIONS

TECHNOLOGICAL FIELD

This invention relates generally to tracking of moving targets from multiple sources, and more particularly to generating tracks of moving targets from electro optical detections.

BACKGROUND ART

References considered to be relevant as background to the presently disclosed subject matter are listed below:
1. "Design and Analysis of Modern Tracking Systems" by Samuel Blackman and Robert Popoli, Artech House, 1999.
2. "Estimation with Applications to Tracking and Navigation", by Yaakov Bar-Shalom, X.-Rong Li, Thiagalingam Kirubarajan, John Wiley & Sons, 2001.
3. "Video Tracking: Theory and Practice", by Emilio Maggio and Andrea Cavallaro, John Wiley & Sons, 2011.
4. "Integrated Tracking, Classification and Sensor Management: Theory and Application", by Mahendra Mallick, Vikram Krishnamurthy, and Ba-Ngu Vo., John Wiley & Sons, 2012.

Acknowledgement of the above references herein is not to be inferred as meaning that these are in any way relevant to the patentability of the presently disclosed subject matter.

BACKGROUND

Tracking is the process of locating of one or more moving objects (or targets) over time. In the case of Electro-Optical tracking, the object motion is obtained from the image sequences acquired from Electro-Optical (EO) sensors. The tracking objective is to collect EO sensor detections from a field of view containing one or more potential targets of interest, and then to partition the sensor detections into sets of tracks produced by the same target. Once the tracks are formed, the number of targets of interest can be estimated, and target parameters, such as target velocity, future prediction positions and target classification characteristics, can be computed for each track.

GENERAL DESCRIPTION

Despite prior art in the area of tracking of moving targets from multiple EO sources, there is still a need to provide the ability to construct fused tracks of high quality for moving targets.

Thus, according to a general aspect of the present invention, a novel tracking system for constructing pictures of tracks of moving targets on a scene from electro-optical detections is provided. The tracking system includes one or more electro optical (EO) sensors configured to provide EO detections in the form of images of the moving targets on the scene, and an EO tracker arranged downstream of the EO sensors, and configured to construct pictures of the tracks of the moving targets from the EO detections.

According to some embodiments of the present invention, the EO tracker includes a pre-processing system, a candidate track selection system arranged downstream of the pre-processing system, a track initializing module coupled to the candidate track selection system, an assigning system arranged downstream of said candidate track selection system, a data updating system arranged downstream of said assigning system and track initializing module, a picture providing system arranged downstream of the data updating system, a tracker database arranged downstream of the data updating system and coupled to the candidate track selection system, and a maintenance system coupled to the tracker database.

According to some embodiments of the present invention, the pre-processing system is configured to receive, sequentially in time, the EO detections of the moving targets and to locate the moving targets on a world map by geo-referencing, so as to provide location coordinates of the moving targets and errors for each coordinate.

According to some embodiments of the present invention, the candidate track selection system is configured to find one or more candidate tracks that can be associated with a current EO detection and/or to generate an indication that no candidate tracks are found.

According to some embodiments of the present invention, the track initializing module is configured to receive the current EO detection from the candidate track selection system and to initialize a new track from the current EO detection upon receipt from the candidate track selection system.

According to some embodiments of the present invention, the assigning system is configured to assign the current EO detection to the candidate tracks provided by the candidate track selection system and/or to initiate a new track for the current EO detection.

According to some embodiments of the present invention, the data updating system is configured to update the candidate tracks after the assigning, and to generate an ambiguity set of tracks and an exclusion set of tracks.

According to some embodiments of the present invention, the picture providing system is configured to receive the ambiguity set and the exclusion set for each element of the ambiguity set from the data updating system, and to generate a picture by excluding the corresponding exclusion set from every element of the ambiguity set. The picture providing system is also configured to calculate a picture score of the produced picture.

According to some embodiments of the present invention, the tracker database is configured to store the updated tracks constructed by the data updating system and to provide the stored tracks to the candidate track selection system.

According to some embodiments of the present invention, the maintenance system is configured to delete obsolete tracks in the tracker database.

According to some embodiments of the present invention, the data updating system includes a coordinate update module, an ambiguity generator arranged downstream of the coordinate update module, and an exclusion generator arranged downstream of the ambiguity generator.

According to some embodiments of the present invention, the coordinate update module is configured to update each track candidate by sequentially calculating updated coordinates, and to update geographical location of the candidate tracks to include the current EO detection. The ambiguity generator is configured to generate an ambiguity set of tracks. The ambiguity set of tracks includes all alternatives for creating updated tracks to include the current EO detection and/or for starting a new track from the current EO detection. The ambiguity generator is configured to calculate an ambiguity element score for each element of the ambiguity set of tracks. The exclusion generator is configured to generate an exclusion set for each element of the ambiguity set of tracks.

According to one embodiment of the present invention, the picture providing system operates sequentially in time for each current EO detection, by using the ambiguity sets and the exclusion set for each element of the ambiguity sets which were constructed up to the current time.

According to another embodiment of the present invention, the picture providing system operates periodically in time with a predetermined time period.

According to still another embodiment of the present invention, the picture providing system operates periodically after each N consequently received detections, where N is a predetermined number larger than 1.

According to some embodiments of the present invention, the tracking system further includes a comparing system arranged downstream of the picture providing system. The comparing system is configured to receive current pictures and to compare these pictures with the previous in time pictures.

According to some embodiments of the present invention, the tracking system includes a plurality of electro optical (EO) sensors operating simultaneously, and a sorting system arranged downstream of said plurality of the EO sensors and upstream of the EO tracker. The sorting system is configured to check a validation of EO detections provided by the EO sensors to find valid EO detections, and to sort the valid EO detections obtained from the EO sensors according to their detection time.

According to some embodiments of the present invention, the tracking system further includes a classification system arranged downstream of the pre-processing system and upstream of the candidate track selection system. The classification system is configured to identify one or more identification parameters of each moving target from the image provided by the EO sensor(s), and to classify the moving targets by their identification parameters. Examples of the identification parameters include, but are not limited to type, size and color of the moving target.

According to another general aspect of the present invention, a novel tracking method for constructing pictures of tracks of moving targets on a scene from electro-optical detections is provided. The method includes providing EO detections in the form of images of the moving targets on the scene, and constructing pictures of the tracks of the moving targets from the EO detections.

According to some embodiments of the present invention, the constructing of the pictures includes receiving, sequentially in time, the EO detections of the moving targets and locating the moving targets on a world map by geo-referencing, so as to provide location coordinates of the moving targets and errors for each coordinate. Then, the constructing of the pictures includes finding one or more candidate tracks that can be associated with a current EO detection or indicating that no candidate tracks are found and initializing a new track from the current EO detection. Thereafter, the current EO detection is assigned to the candidate tracks and/or a new track for the current EO detection is initiated. After the assigning, the candidate tracks are updated by calculating updated coordinates, storing the updated tracks, and updating a geographical location of the updated tracks to include the current EO detection. The constructing of the pictures also includes generating an ambiguity set of tracks including all alternatives of the updated tracks associated with the current EO detection, and calculating an ambiguity element score for each element of the ambiguity set of tracks. Thereafter an exclusion set of tracks is generated for all elements of the ambiguity set of tracks. The exclusion set for an element of the ambiguity set includes all excluded tracks of this element in the ambiguity set. The constructing of the pictures further includes receiving the ambiguity set and the exclusion set for each desired element of the ambiguity set, and generating the pictures of the tracks. The generating of the pictures comprises excluding the excluded tracks from the elements of the ambiguity set to obtain a non-conflicting ambiguity set including only non-conflicting tracks for the current EO detection in each desired element of the non-conflicting ambiguity set.

According to some embodiments of the present invention, the assigning of the current EO detection to a candidate track includes computing likelihood of association of the current EO detection with the candidate track to provide an associated track. Preferably, but not mandatory, the assigning of the current EO detection to the candidate track is carried out by using a Maximum Likelihood filter.

According to some embodiments of the present invention, the method includes deleting obsolete tracks.

According to some embodiments of the present invention, the receiving of the ambiguity set and the exclusion set for each element of the ambiguity set is carried out sequentially in time for each current EO detection.

According to some embodiments of the present invention, the generating of the pictures of the tracks includes, first, selecting an element from the ambiguity set having a highest ambiguity element score and generating a picture by excluding the corresponding exclusion set from the element. Such a picture represents a non-conflicting ambiguity element that includes only non-conflicting tracks for the current EO detection. A picture score is also calculated for this picture.

Then, another element is selected from the ambiguity set that has the ambiguity element score smaller than the ambiguity element score of the previous element, but still has a high score, e.g. "second best" element. Another picture is generated by excluding the corresponding exclusion set from this other element, and a picture score of this other picture is calculated.

Such procedure of selection of the elements from the ambiguity set, generating the pictures and calculating the picture scores of the generated pictures, can be performed for as many elements of the ambiguity set as desired. Finally, the picture having the greatest picture score from the pictures generated above can be selected, and displayed to an operator, or any other user of the tracking system.

According to some embodiments of the present invention, the tracking method further includes comparing, sequentially in time, the current picture having the greatest picture score with the previous in time picture having the greatest picture score. Such comparing the current picture with the previous picture can include updating the current picture by omitting the old tracks from the picture (which become obsolete), marking the new tracks, and marking the hidden tracks.

According to some embodiments of the present invention, the providing of the EO detections is performed from a plurality of electro optical (EO) sensors. According to this embodiment, the tracing method includes sorting the EO detections obtained from the plurality of the EO sensors according to their detection time. This sorting is performed before the constructing of the pictures.

According to some embodiments of the present invention, the tracking method also includes identifying a type and a color of each moving target from the image, and providing classification of the targets by their type and color before constructing of the pictures.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
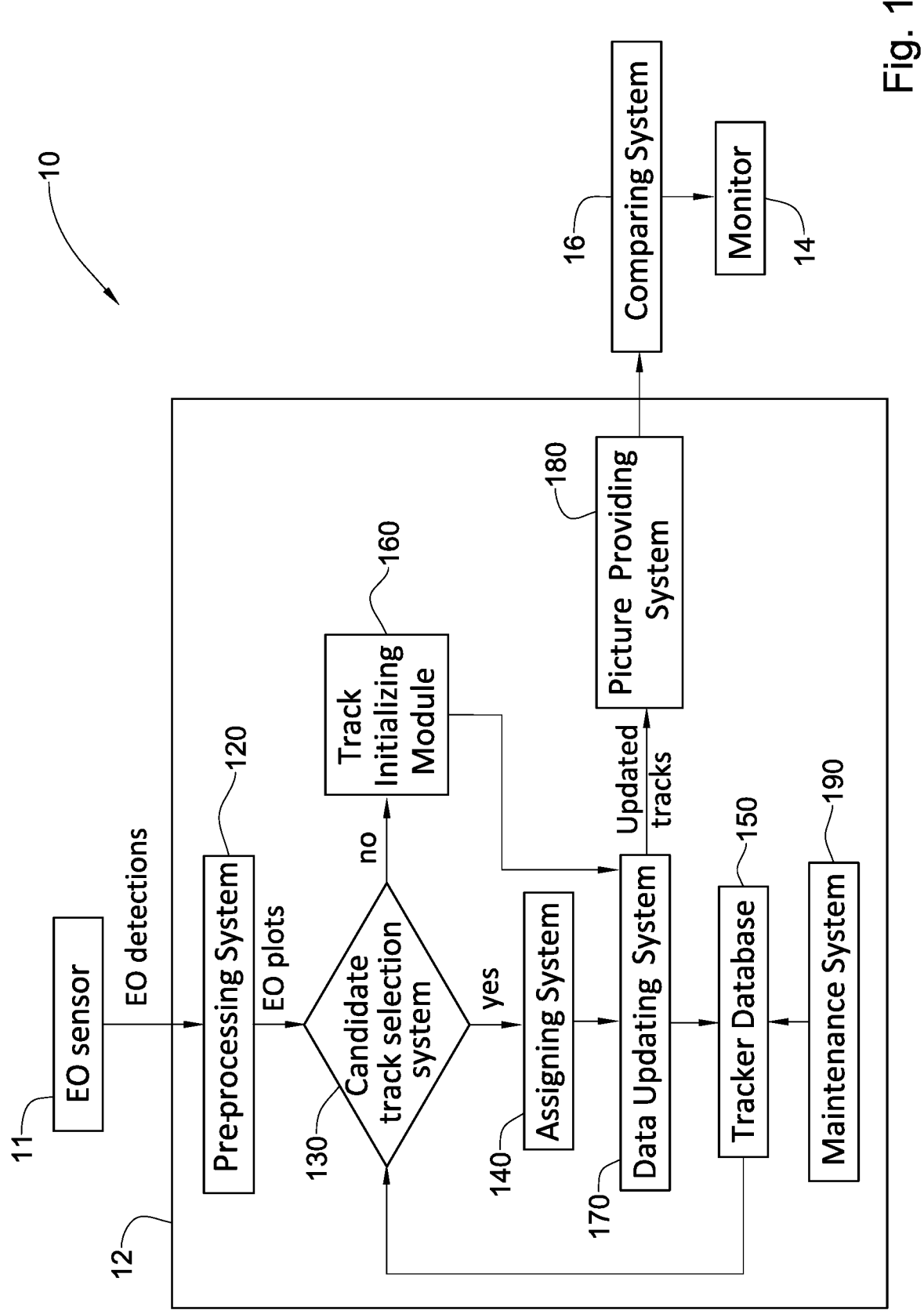
FIG. 1 illustrates a general block diagram of a tracking system for constructing pictures of tracks of moving targets from electro-optical (EO) detections, according to one embodiment of the present invention.

The principles and operation of the system and method for constructing pictures of tracks of a moving target from electro-optical detections, according to the present invention may be better understood with reference to the drawings and the accompanying description, it being understood that these drawings and examples in the description are given for illustrative purposes only and are not meant to be limiting. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

System, device and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The same reference numerals and alphabetic characters will be utilized for identifying those components which are common in the tracking system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Referring to FIG. 1, a general block diagram of a tracking system 10 for constructing pictures of tracks of moving targets (not shown) on a scene from electro-optical (EO) detections is illustrated, according to some embodiments of the present invention. The tracking system 10 includes an electro optical (EO) sensor 11 providing EO detections in the form of images of moving targets, and an EO tracker 12 arranged downstream of the EO sensors 11. The EO tracker 12 is configured to construct pictures of the tracks of one or more moving targets (not shown) from the EO detections.

According to an embodiment of the present invention, the EO tracker 12 includes a pre-processing system 120, a candidate track selection system 130 arranged downstream of the pre-processing system 120, a candidate track selection system 130 arranged downstream of said pre-processing system 120, an assigning system 140 and a track initializing module 160 both arranged downstream of the candidate track selection system 130, a data updating system 170 arranged downstream of the assigning system 140 and the track initializing module 160, and a picture providing system 180 arranged downstream of the data updating system 170. Moreover, the EO tracker 100 includes a tracker database 150 arranged downstream of the data updating system 170 and coupled to the candidate track selection system 130, and a maintenance system 190 coupled to the tracker database 150.

Each EO detection of the EO sensor 11 includes information on a location of the moving target on a scene. It should be understood that if the location (e.g., longitude and latitude) of the picture's scene is known on the world map, then, by applying geo-referencing, location of the target presented in the picture can also be known on the map. According to an embodiment of the present invention, the pre-processing system 120 is configured to receive the EO detections of the target sequentially in time, and to locate the target on a world map by geo-referencing in order to provide the location coordinates of the target, and the corresponding errors for each coordinate.

According to an embodiment of the present invention, the candidate track selection system 130 is configured to find, sequentially in time, a plurality of candidate tracks stored in the tracker database 150 that can be associated with the current EO detection received from the pre-processing system 120. For example, if a distance between the current EO detection and a track at the time of the current EO detection does not exceed a predetermined value (e.g. several meters), such a track can be considered as a candidate track.

If suitable candidate tracks are not found, the candidate track selection system 130 is configured to indicate that no candidate tracks are found and to forward the current EO detection to the track initializing module 160. Upon receipt of the current EO detection from the candidate track selection system 130, the track initializing module 160 is configured to initialize a new track from the current EO detection.

The assigning system 140 is configured for sequentially assigning the current EO detection to the candidate tracks provided by the candidate track selection system 130 or for initiating a new track for the current detection. In operation, the assigning system 140 computes a likelihood of association between the current EO detection and each candidate track at the time of the current EO detection by applying a suitable filter to the current EO detection. The inventors of the present invention compared the results of application of various known filters selected from a Covariance Intersection filter, a Maximum Likelihood filter and a Kalman Filter, and found that the best correspondence between the tracks constructed in accordance with the present invention and the real motion of the moving target on the scene, is obtained when a Maximum Likelihood filter is used.

The associated tracks obtained as results of the likelihood association and/or a new track provided by the track initializing module 160 are sequentially fed to the data updating system 170 that is configured for updating tracks after the assigning, and for generating an ambiguity set of tracks and an exclusion set of tracks.

Figure 2:
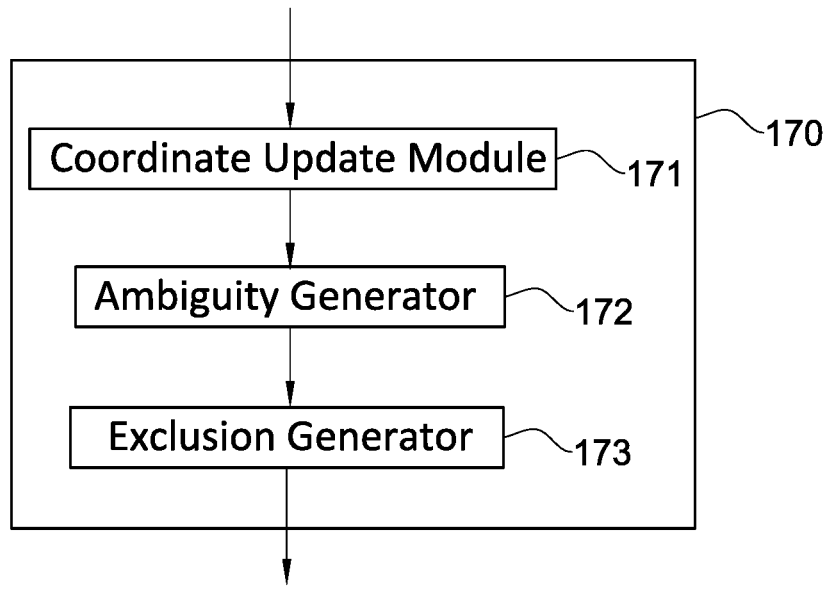
FIG. 2 illustrates a block diagram of a data updating system of the tracking system of FIG. 1, according to some embodiment of the present invention.

Referring to FIG. 2, a block diagram of a data updating system 170 of the tracking system of FIG. 1 is shown, according to some embodiments of the present invention. The data updating system 170 includes a coordinate update module 171, an ambiguity generator 172 arranged downstream of the coordinate update module 171 and an exclusion generator 173 arranged downstream of the ambiguity generator 172.

The coordinate update module 171 is configured to update each candidate track by sequentially calculating updated coordinates, and to update a geographical location of each candidate track to include the current EO detection. It should be understood that the updated tracks are longer in the number of the EO detections and in time, since they include the current EO detection. The updated tracks are relayed to the tracker database (150 in FIG. 1) for storing and to the ambiguity generator 172 for further processing.

According to some embodiments, the tracker database 150 of the tracking system 10 is configured to store the updated tracks constructed by the data updating system 170 and to provide the stored tracks to the candidate track selection system 130. The tracker database 150 is maintained by the maintenance system 190 that is configured for deleting obsolete tracks. Maintenance can, for example, be carried out periodically by the maintenance system 190 once every few seconds. In operation, the maintenance system 190 checks for obsolete tracks. For example, obsolete tracks are the tracks which have not been updated for a long time. Such obsolete tracks can be detected, and then deleted when the elapsed time from the last update is more than a given time constant.

According to an embodiment of the present invention, the ambiguity generator 172 is configured to sequentially generate an ambiguity set of tracks. The ambiguity set is a set of all alternatives for the updated tracks associated with the current EO detection, which are provided by the candidate track selection system (130 in FIG. 1). The ambiguity set of tracks includes a set of all alternatives for creating updated tracks to include the current EO detection, and to start a new track from the current EO detection.

According to some embodiments of the present invention, the ambiguity generator 172 is also configured to calculate an ambiguity element score for each element (alternative) of the ambiguity set of tracks. In the present application, the elements of the ambiguity set are also referred to as alternatives of the ambiguity set. The ambiguity element score of an alternative is calculated as a weighted sum of such features as the likelihood of the association, the number of detections associated in the track and the quality of the detections. It should be understood that the longer the tracks and/or the higher the likelihood computed by assigning system (140 in FIG. 1), the greater the score of the corresponding alternative.

FIGS. 3A through 3E illustrate a simplified example of all possible associations of a current EO detection 3 at time t3 with candidate tracks for two sequential EO detections 1 and 2 of a target at times t1 and t2, correspondingly, where t1<t2<t3. For this case, an ambiguity set that is created by the ambiguity generator 172 can include five alternatives.

Figure 3A:
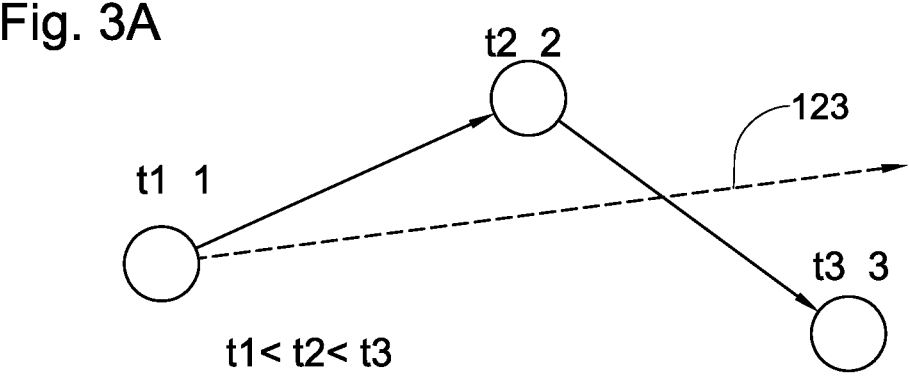
FIGS. 3A through 3E illustrate a simplified example of all possible associations of a current EO detection with candidate tracks.
Figure 3B:
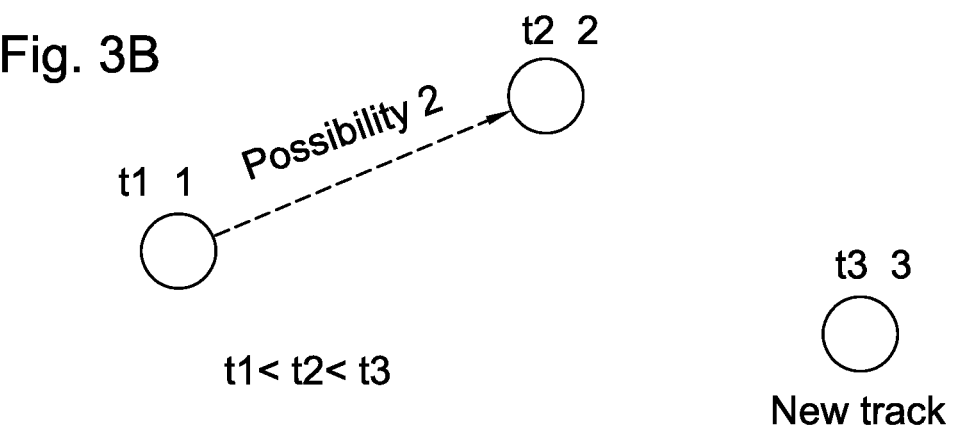
Figure 3C:
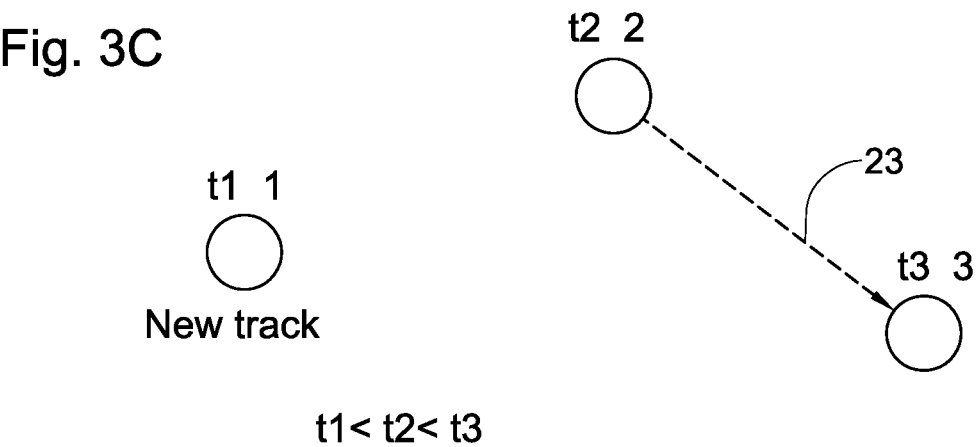
Figure 3D:
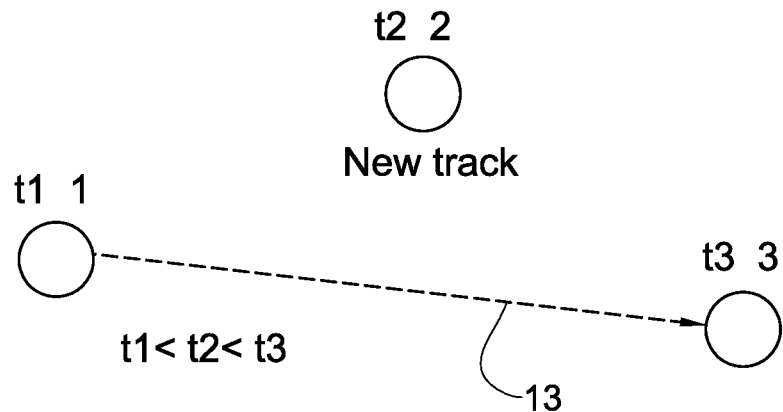
Figure 3E:
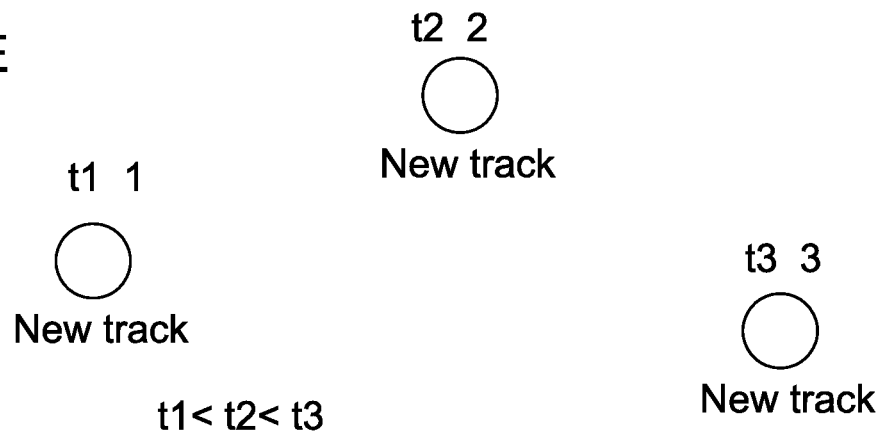

Specifically, FIG. 3A shows a first alternative in which the detections 1, 2 and 3 are connected by a common "smoothed" track 123. FIG. 3B shows a second alternative, in which a track 12 is formed between the detections 1 and 2, while a new track is started from detection 3. A third alternative is shown in FIG. 3C, in which a track 23 is formed between detections 2 and 3, while a new track is started from detection 1. A fourth alternative is shown in FIG. 3D, in which a track 13 is formed between detections 1 and 3, while a new track is started from detection 2. A fifth alternative can be in the case when no associations are established between the three sequential EO detections 1, 2 and 3. In this case, as shown in FIG. 3E, a new track is started from each detection.

Turning back to FIG. 2, the exclusion generator 173 is configured to generate, sequentially, an exclusion set for each element (alternative) of the ambiguity set of tracks. The exclusion set, for an alternative of the ambiguity set, includes all excluded tracks in this alternative, i.e. the tracks which are in conflict with the current alternative. The excluded tracks for the current EO detection are those updated tracks, which cannot co-exist with already existing tracks in the alternative, since at least one of the previous EO detections already belongs to these excluded tracks.

Referring to FIGS. 1 and 2 together, according to some embodiments of the present invention, the picture providing system 180 is configured to receive the ambiguity set and the exclusion set for any desired number of elements (i.e., alternatives) of the ambiguity set from the data updating system 170, and to exclude the excluded tracks from the received elements (alternatives) of the ambiguity set. After performing this exclusion for each desired element of the ambiguity set, a non-conflicting ambiguity set can be obtained for these elements that includes only non-conflicting tracks for the EO detections received so far in each desired element of the non-conflicting ambiguity set.

According to one embodiment of the present invention, the picture providing system 180 operates sequentially in time for each current EO detection, by using the ambiguity sets and the exclusion set for each element of the ambiguity sets which were constructed up to the current time. Specifically, after receiving an ambiguity set for each current EO detection and the corresponding exclusion sets, the picture providing system 180 selects one or more alternatives of the ambiguity set for each current EO detection, and excludes the corresponding exclusion sets from these alternatives. In operation, the picture providing system 180 first selects the best alternative of the ambiguity set, i.e., the alternative that has the highest ambiguity element score. Then, the picture providing system 180 excludes the corresponding exclusion set from the best alternative of the ambiguity set, thereby to generate, for the best alternative, a non-conflicting ambiguity element that includes only non-conflicting tracks for the current EO detection. It should be noted that this non-conflicting ambiguity element represents a picture that can be, sequentially, displayed to a user of the system.

Figure 4:
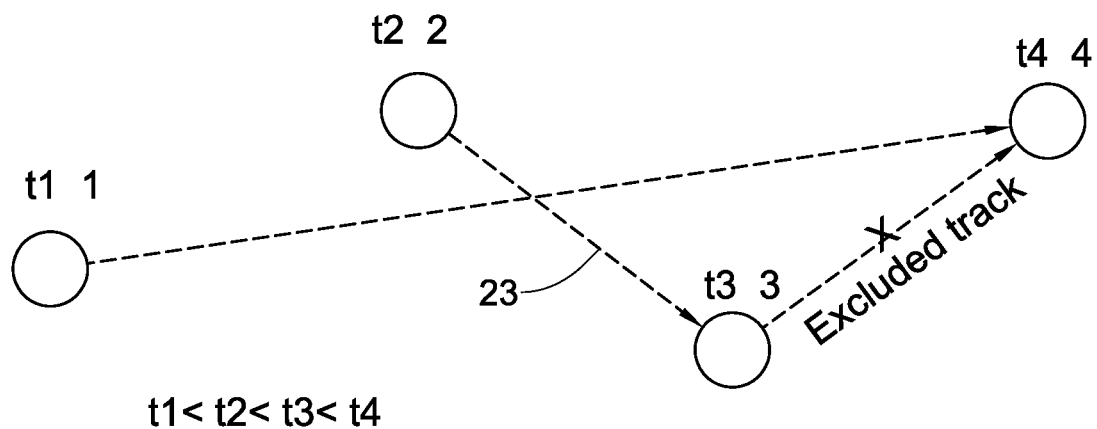
FIG. 4 illustrates a simplified example of obtaining non-conflicting tracks for four sequential in time EO detections.

FIG. 4 illustrates a simplified example of obtaining non-conflicting tracks for four sequential EO detections 1, 2, 3 and 4 of a target at times t1, t2, t3 and t4, correspondingly, where t1<t2<t3<t4. In this example, the construction of non-conflicting tracks starts from the third alternative picture (that is shown in FIG. 3C) for a new detection 4. This alternative is selected as the best alternative, i.e. having the greatest ambiguity element score. In this case, the track 23 was already formed between the detections 2 and 3, and the other track started from detection 1. Thus, for detection 4, the exclusion generator 173 excludes the track between detections 2 and 4, and the track between detections 3 and 4. In this case, in the non-conflicting ambiguity set, the corresponding alternative includes only non-conflicting tracks 23 and 14.

When desired, the picture providing system 180 can further (i) select another alternative from the ambiguity set, which has an ambiguity element score smaller than the ambiguity element score of the best alternative; and (ii) generate, for this alternative, another non-conflicting ambiguity element that also includes only non-conflicting tracks for the current EO detection. This other non-conflicting ambiguity element represents another picture that can also be displayed to a user of the system for each EO detection simultaneously with the picture corresponding to the best alternative.

Figure 5:
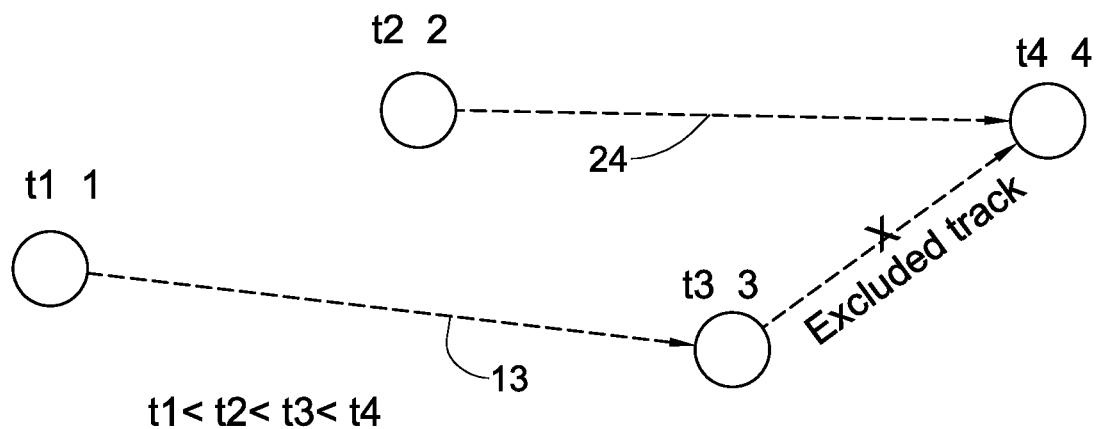
FIG. 5 illustrates another simplified example of obtaining non-conflicting tracks for four sequential EO detections.

FIG. 5 illustrates another simplified example of obtaining non-conflicting tracks for four sequential EO detections 1, 2, 3 and 4 of a target at times t1, t2, t3 and t4, correspondingly, where t1<t2<t3<t4. In this example, the construction of non-conflicting tracks starts from the fourth alternative picture (that is shown in FIG. 3D) for a new detection 4. This alternative is selected as the best alternative. In this case, track 13 was already formed between detections 1 and 3, and the other track started from detection 2. Thus, for detection 4, the exclusion generator 173 excludes the track between detections 1 and 4. In this case, the corresponding alternative in the non-conflicting ambiguity set, includes only non-conflicting tracks 13 and 24.

When desired, the procedure for creating ambiguities and generation of pictures for each EO detection can be carried out for any desired number of alternatives of the ambiguity set.

According to some embodiments of the present invention, the picture providing system 180 is also configured to calculate picture scores for the pictures. A picture score can, for example, be calculated as a sum of the scores of the tracks in the picture. In the example shown in FIG. 4, the score of the corresponding picture can be calculated as a sum of the scores of the non-conflicting tracks 23 and 14. Likewise, the picture score of the picture corresponding to the example shown in FIG. 5, can be calculated as a sum of the scores of the non-conflicting tracks 13 and 24.

Each track in a picture is characterized by a score based on one or more parameters that include, but are not limited to, a number of EO plots in the track (i.e., the length of the track), a "quality" of the associations (e.g., the statistical likelihood of the track), a status of the track, etc. The status of a given track in the picture can, for example, be "new track", i.e. the track that is currently created with the current EO detection. Likewise, the status of a given track in the picture can be "old track", i.e., the tracks that are generated from the previous EO detections, but do not include the current EO detection. The status of a given track in the picture can also be "hidden track", i.e. the track which was generated from the current and previous EO detections, but does not appear in the current picture.

The picture having a greater total picture score can finally be selected for presentation to a user of the system.

According to another embodiment of the present invention, the picture providing system 180 operates periodically in time with a predetermined time period. In operation, the picture providing system 180 uses the ambiguity set and the exclusion set for desired elements (i.e., alternatives) of the ambiguity set received from the data updating system 170 in order to generate a picture every predetermined time period, for example, every several seconds. During this time period, the EO sensor 11 can take N subsequent EO detections. For example, N can be in the range of 2 to 100.

According to still another embodiment of the present invention, the picture providing system 180 operates periodically after each N consequently received detections, where N is a predetermined number larger than 1. The picture providing system 180 can receive the ambiguity and exclusion sets data corresponding to all N detections, and to generate a picture from any alternatives of the corresponding non-conflicting ambiguity set.

In this embodiment, the picture having a greater picture score produced from the set of all N subsequent EO detections can finally be selected for presentation to a user of the system.

Turning back to FIG. 1, according to some embodiments of the present invention, the tracking system 10 further includes a comparing system 16 arranged downstream of the picture providing system 180. The comparing system 16 is configured to receive the current best pictures, i.e. the pictures having the greatest scores, and to compare these pictures with the previous in time best pictures. The comparing includes updating the best pictures by omitting the old tracks which become obsolete, marking the new tracks, and marking the hidden tracks. Such comparing actions performed by the comparing system 16 are referred herein to as a TSP (Tactical Situation Picture) processing. The TSP processing yields the updated best picture with the set of non-conflicting tracks at a given time, which is based on the current best picture produced by the picture providing system 180 and the previous in time picture. The updated current best picture together with the status of the tracks in this picture are presented to an operator of the system 10 on a monitor 14.

When desired, the operator of the system can be presented not only with the best pictures, but also the pictures having the lower score (e.g., second best picture) than the best picture. The operator can view these presentations and decide whether the pictures with the highest score, or any other pictures (with similar scores) seem more reasonable.

Figure 6:
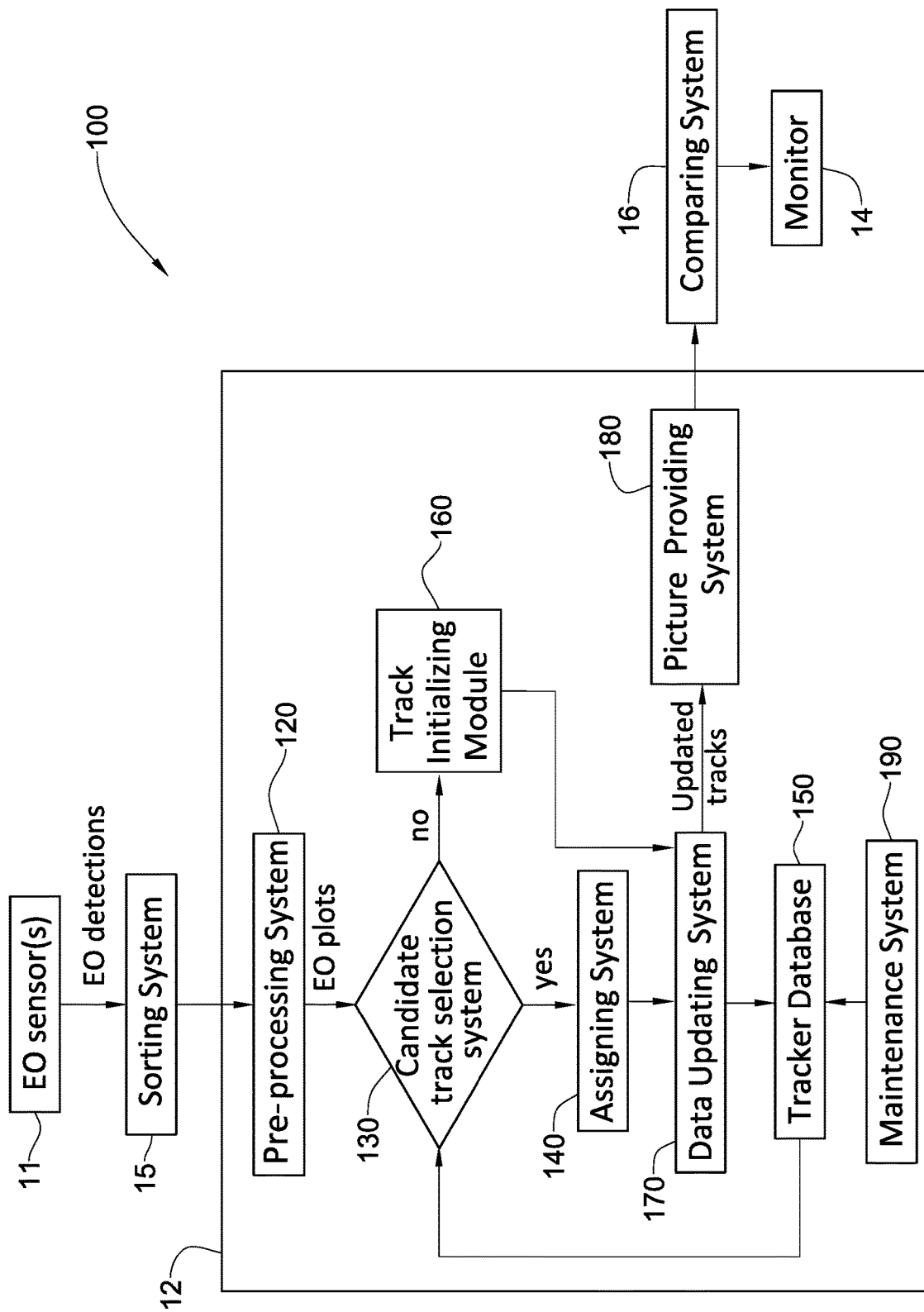
FIG. 6 illustrates a general block diagram of a tracking system for constructing pictures of tracks of moving targets from electro-optical (EO) detections, according to another embodiment of the present invention.

Referring to FIG. 6, a general block diagram of a tracking system 100 for constructing pictures of tracks of moving targets on a scene from electro-optical (EO) detections is illustrated, according to an embodiment of the present invention. The tracking system 100 differs, inter alia, from tracking system (10 in FIG. 1) in the fact that it includes a plurality of electro optical (EO) sensors 11 operating simultaneously, and a sorting system 15 arranged downstream of the (EO) sensors 11 and upstream of the EO tracker 12. The EO sensors 11 may be of the same or different types. Each sensor transfers in real time its EO detections to the sorting system 15.

The sorting system 15 is configured to check a validation of EO detections provided by the EO sensors 11 in order to find valid EO detections. The EO detections are considered valid if the noises of the EO detections are relatively low and no data are missing. If EO detections are not valid, the sorting system 15 deletes them, otherwise the sorting system 15 continues to process the valid EO detections. Thus, the sorting system 15 is also configured to sort the EO detections obtained from the EO sensors 11, according to their detection time, and to transfer the sorted EO detections, one by one, to the pre-processing system (120 in FIG. 1) for further processing as described hereinabove. It should be noted that all the EO detections are treated in the same way, regardless of the number and the type of the EO sensor 11.

Figure 7:
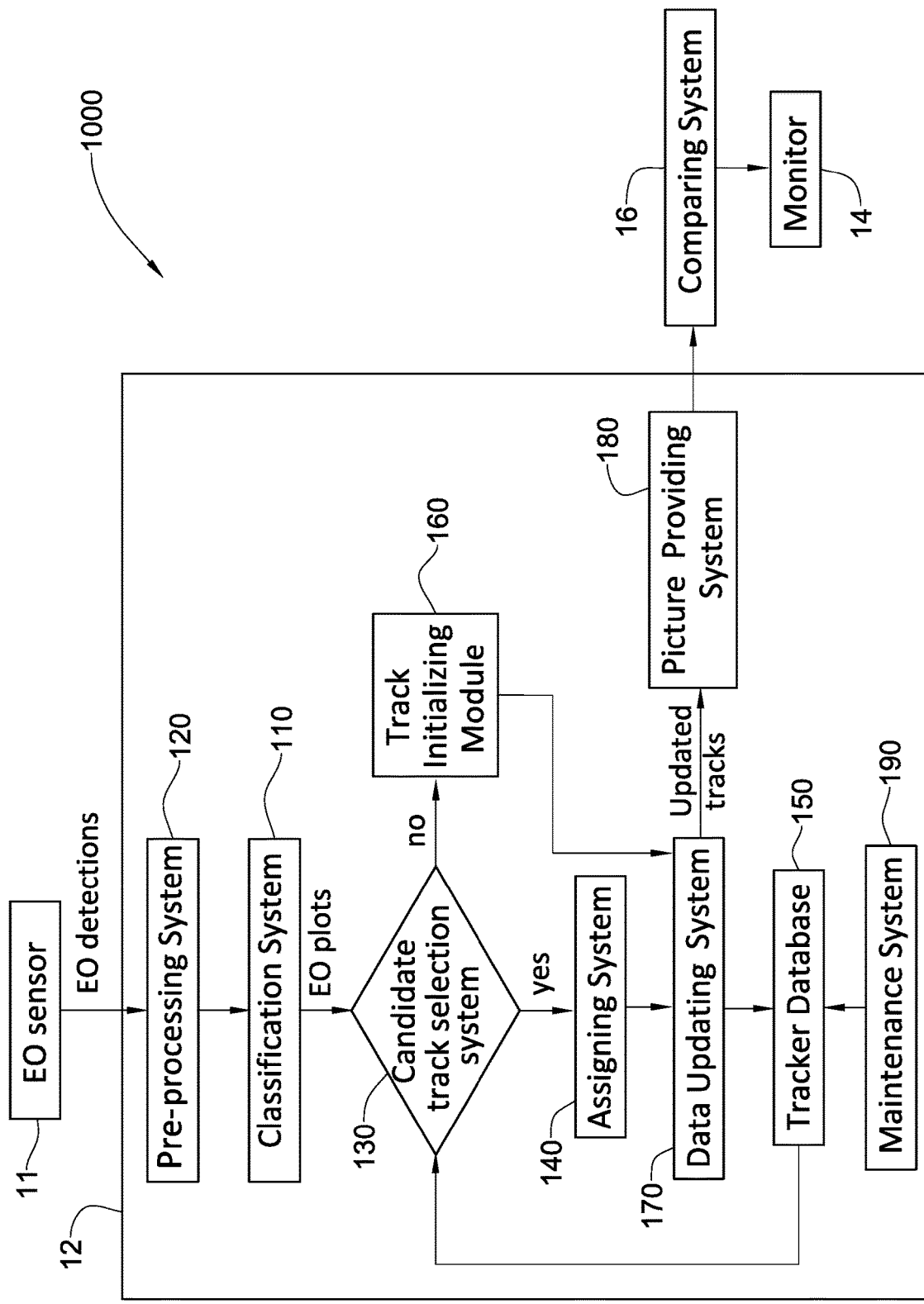
FIG. 7 illustrates a general block diagram of a tracking system for constructing pictures of tracks of moving targets from electro-optical (EO) detections, according to still another embodiment of the present invention.

Referring to FIG. 7, there is illustrated a general block diagram of a tracking system 1000 for constructing pictures of tracks of moving targets on a scene from electro-optical (EO) detections, according to yet another embodiment of the present invention. The tracking system 1000 differs, inter alia, from tracking system (10 in FIG. 1) in the fact that the EO tracker 12 of the tracking system 1000 further includes a classification system 110 arranged downstream of the pre-processing system 120 and upstream of the candidate track selection system 130. The classification system 110 is configured to identify one or more identification parameters of each moving target from the image provided by the EO sensor(s) 11, and to classify the moving targets by their identification parameters. Examples of the identification parameters include, but are not limited to type, size and color of the moving target.

In operation, the pre-processing system 120 provides EO plots characterized by the location coordinates of the moving target and the corresponding errors for each coordinate. The classification system 110 further yields to the EO plots the type, size, color and/or other parameters of the moving target, as well as probabilities for evidence of these classification identifications.

The EO plots produced by the pre-processing system 120 and the classification system 110 are fed to the candidate selection system 130. The candidate selection system 130 is configured to find, sequentially in time, a plurality of candidate tracks stored in the tracker database 150 that can be associated with the current EO detection received from the pre-processing system 120 and classified by the classification system 110. The candidate selection system 130 is configured to exclude the track candidates having different type and/or color. It should be noted that the exclusion may not be strict, and, in some cases, the candidate selection system 130 may not exclude track candidates with different identifications, when the corresponding measurement errors of the identification data are relatively great.

The assigning system 140 sequentially in time assigns the current EO plot to the candidate tracks provided by the candidate track selection system 130 and/or initiates a new track for the current EO detection. According to this embodiment, the assigning system 140 is also configured to analyze each association of the current EO plot and track candidates, and to decide on whether to ignore the association if the identification data (e.g., the type, size and/or color of the moving target) are not the same or to still keep it. For example, when the errors related to the identification of color are significant, the assigning system 140 can keep the association, even if the color provided by the classification system 110 is different, but the type and/or the size is/are the same. When there is a decision to keep the association by the classification system, the geographic correlation (statistical distance based on likelihood) is checked, in order to approve the association as a tentative track update.

Operation of the track initializing module 160, data updating system 170, the picture providing system 180, the tracker database 150, and the maintenance system 190 of the tracking system 1000 are similar to the operation of the corresponding components of the system (10 in FIG. 1), mutatis mutandis, and therefore are not described hereinbelow in detail.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the words "comprising", "including" and "having" as used throughout the appended claims are to be interpreted to mean "including but not limited to".

It is important, therefore, that the scope of the invention is not construed as being limited by the illustrative embodiments set forth herein. Other variations are possible within the scope of the present invention as defined in the appended claims Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A tracking system for constructing pictures of tracks of moving targets on a scene from electro-optical (EO) detections, the tracking system comprising:
   at least one EO sensor configured to provide EO detections in the form of images of the moving targets on the scene; and
   an EO tracker arranged downstream of said at least one EO sensor, and configured to construct pictures of the tracks of the moving targets from the EO detections, the EO tracker comprising:
   a pre-processing system configured to receive, sequentially in time, the EO detections of the moving targets and to locate the moving targets on a world map by geo-referencing, so as to provide location coordinates of the moving targets and errors for each coordinate;
   a candidate track selection system arranged downstream of the pre-processing system, said candidate track selection system configured to find at least one candidate track that can be associated with a current EO detection and/or to generate an indication that no candidate tracks are found;
   a track initializing module coupled to the candidate track selection system, and configured to receive the current EO detection from the candidate track selection system and to initialize a new track from the current EO detection upon receipt from the candidate track selection system;

an assigning system arranged downstream of said candidate track selection system, and configured to assign the current EO detection to the candidate tracks provided by the candidate track selection system and/or to initiate a new track for the current EO detection;

a data updating system arranged downstream of said assigning system and track initializing module, said data updating system configured to update the candidate tracks after the assigning, and to generate an ambiguity set of tracks and an exclusion set of tracks;

a picture providing system arranged downstream of the data updating system, and configured to receive the ambiguity set and the exclusion set for each element of the ambiguity set from the data updating system, to generate a picture by excluding the corresponding exclusion set from a desired element of the ambiguity set, and to calculate a picture score of the produced pictures;

a tracker database arranged downstream of the data updating system and coupled to the candidate track selection system, the tracker database configured to store the updated tracks constructed by the data updating system and to provide the stored tracks to the candidate track selection system; and a maintenance system coupled to the tracker database, and configured to delete obsolete tracks in the tracker database.

2. The tracking system of claim 1, wherein the data updating system includes:
a coordinate update module configured to update each track candidate by sequentially calculating updated coordinates, and to update geographical location of the candidate tracks to include the current EO detection;
an ambiguity generator arranged downstream of the coordinate update module, and configured to generate an ambiguity set of tracks; and
an exclusion generator arranged downstream of the ambiguity generator and configured to generate an exclusion set for each element of the ambiguity set of tracks.

3. The tracking system of claim 2, wherein said ambiguity set of tracks includes all alternatives for creating updated tracks to include the current EO detection and/or for starting a new track from the current EO detection.

4. The tracking system of claim 2, wherein the ambiguity generator is configured to calculate an ambiguity element score for each element of the ambiguity set of tracks.

5. The tracking system of claim 1, wherein the picture providing system operates sequentially in time for each current EO detection, by using the ambiguity sets and the exclusion set for each element of the ambiguity sets which were constructed up to the current time.

6. The tracking system of claim 1, wherein the picture providing system operates periodically in time with a predetermined time period.

7. The tracking system of claim 1, wherein the picture providing system operates periodically after each N consequently received detections, where N is a predetermined number larger than 1.

8. The tracking system of claim 1, further comprising a comparing system arranged downstream of the picture providing system, the comparing system configured to receive current pictures and to compare these pictures with the previous in time pictures.

9. The tracking system of claim 1, further comprising:
a plurality of electro optical (EO) sensors operating simultaneously; and
a sorting system arranged downstream of said plurality of the EO sensors and upstream of the EO tracker, the sorting system configured to check a validation of EO detections provided by the EO sensors to find valid EO detections, and to sort the valid EO detections obtained from the EO sensors according to their detection time.

10. The tracking system of claim 1, wherein the EO tracker further includes a classification system arranged downstream of the pre-processing system and upstream of the candidate track selection system; the classification system configured to identify at least one classification parameter of each moving target from the image provided by said at least one EO sensor, and to classify the moving targets.

11. A tracking method for constructing pictures of tracks of moving targets on a scene from electro-optical detections, the tracking method comprising:
providing EO detections in the form of images of the moving targets on the scene; and
constructing pictures of the tracks of the moving targets from the EO detections, the constructing of the pictures comprising:
receiving, sequentially in time, the EO detections of the moving targets and locating the moving targets on a world map by geo-referencing, so as to provide location coordinates of the moving targets and errors for each coordinate;
finding at least one candidate track that can be associated with a current EO detection or indicating that no candidate tracks are found, and initializing a new track from the current EO detection;
assigning the current EO detection to the candidate tracks and/or to initiate a new track for the current EO detection;
updating the candidate tracks after the assigning by calculating updated coordinates, storing the updated tracks, and updating a geographical location of the updated tracks to include the current EO detection;
generating an ambiguity set of tracks including all alternatives of the updated tracks associated with the current EO detection and calculating an ambiguity element score for each element of the ambiguity set of tracks;
generating an exclusion set of tracks for any desired number of elements of the ambiguity set of tracks, the exclusion set for an element of the ambiguity set including all excluded tracks in said element of the ambiguity set;
receiving the ambiguity set and the exclusion set for each desired element of the ambiguity set and generating the pictures of the tracks, the generating of the pictures comprising excluding the excluded tracks from the desired elements of the ambiguity set to obtain a non-conflicting ambiguity set including only non-conflicting tracks for the current EO detection in each desired element of the non-conflicting ambiguity set.

12. The tracking method of claim 11, wherein assigning of the current EO detection to a candidate track includes computing likelihood of association of the current EO detection with the candidate track to provide an associated track.

13. The tracking method of claim 11, wherein the assigning of the current EO detection to the candidate track is carried out by using a Maximum Likelihood filter.

14. The tracking method of claim 11, comprising deleting obsolete tracks.

15. The tracking method of claim 11, wherein said generating of the pictures of the tracks includes:
selecting an element from the ambiguity set having a highest ambiguity element score, generating a picture by excluding the corresponding exclusion set from the element, the picture including a non-conflicting ambiguity element that includes only non-conflicting tracks for the current EO detection, and calculating a picture score of the picture;
selecting another element from the ambiguity set having the ambiguity element score smaller than the ambiguity element score of the previous element, generating another picture by excluding the corresponding exclusion set from said another element, and calculating a picture score of said another picture;
performing the selection of the elements from the ambiguity set, generating the pictures and calculating the picture scores of the generated pictures for as many elements of the ambiguity set as desired;
selecting the picture having the greatest picture score from the pictures generated above; and
displaying the picture having the greatest picture score.

16. The tracking method of claim 15, further comprising comparing, sequentially in time, a current picture having the greatest picture score with the previous in time picture having the greatest picture score.

17. The tracking method of claim 16, wherein the comparing the current picture with the previous picture includes updating the current picture by omitting the old tracks which become obsolete, marking the new tracks, and marking the hidden tracks.

18. The tracking method of claim 11, wherein the receiving of the ambiguity set and the exclusion set for each desired element of the ambiguity set is carried out sequentially in time for one detection in N subsequent EO detections, where N is the predetermined number larger than 1.

19. The tracking method of claim 11, wherein the providing of the EO detections is performed from a plurality of electro optical (EO) sensors, and wherein the method includes sorting the EO detections obtained from said plurality of the EO sensors according to their detection time before said constructing of the pictures of the tracks of the moving targets.

20. The tracking method of claim 11, comprising identifying at least one identification parameter of each moving target from the image, and providing classification of the moving targets before said constructing of the pictures of the tracks of the moving targets.

* * * * *